(12) United States Patent
Ramesh et al.

(10) Patent No.: US 6,731,619 B1
(45) Date of Patent: May 4, 2004

(54) METHOD AND SYSTEM FOR USING ONE TYPE OF TRANSMIT DIVERSITY IN A FIRST TIME SLOT AND A SECOND TYPE IN AN ADJACENT TIME SLOT

(75) Inventors: Rajaram Ramesh, Cary, NC (US); Kambiz C. Zangi, Durham, NC (US)

(73) Assignee: Ericsson Inc., Research Triangle Park, NC (US)

( * ) Notice: Subject to any disclaimer, the term of this patent is extended or adjusted under 35 U.S.C. 154(b) by 862 days.

(21) Appl. No.: 09/630,750

(22) Filed: Aug. 2, 2000

(51) Int. Cl.[7] .............................................. H04Q 7/00
(52) U.S. Cl. ...................................... 370/334; 370/442
(58) Field of Search ................................ 370/310, 321, 370/328, 330, 334, 336, 337, 345, 347, 442, 458, 516, 517

(56) References Cited

U.S. PATENT DOCUMENTS

| | | | |
|---|---|---|---|
| 5,832,044 A | * 11/1998 | Sousa et al. ................. | 375/347 |
| 5,930,248 A | * 7/1999 | Langlet et al. ............... | 370/347 |
| 5,960,330 A | 9/1999 | Azuma | |
| 6,072,792 A | * 6/2000 | Mazur et al. ................ | 370/345 |

FOREIGN PATENT DOCUMENTS

| | | |
|---|---|---|
| GB | 2237706 | 8/1991 |
| WO | WO 99/59263 | 11/1999 |
| WO | WO 00/11806 | 3/2000 |

OTHER PUBLICATIONS

"Downlink Transmit Diversity Schemes For CDMA Networks", Thompson et al. 1999; pp. 1382–1386, XP000922334.
"Transmit Diversity Using Decision-Directed Antenna Hopping", Heath et al. 1999; pp. 141–145, XP010351114.

* cited by examiner

*Primary Examiner*—David Vincent
(74) *Attorney, Agent, or Firm*—Coats & Bennett, P.L.L.C.

(57) ABSTRACT

An approach to hybrid transmit diversity which involves the transmission of information using different forms of transmit diversity for at least two adjacent time slots is disclosed. A base station transmits information using a first transmit diversity technique during a first time slot and then using a second transmit diversity technique in an adjacent time slot, such as the next subsequent time slot. Thus, a base station may transmit information to mobile terminal X using delay diversity during one time slot and then transmit information to mobile terminal Y using space-time diversity during the next time slot. This approach may also be used to transmit the GSM the FCCH with combined delay diversity and antenna hopping diversity (actual or virtual) while other GSM channels are transmitted with just delay diversity. Methods are also disclosed for accommodating the change in diversity techniques between the time slots that involve either transmitting dummy symbol(s) as part of the data field or stealing symbol(s) from the sync field to use in the data field.

37 Claims, 3 Drawing Sheets

METHOD AND SYSTEM FOR USING ONE TYPE OF TRANSMIT DIVERSITY IN A FIRST TIME SLOT AND A SECOND TYPE IN AN ADJACENT TIME SLOT

BACKGROUND OF THE INVENTION

The present invention relates to wireless communications, and more particularly to wireless communications using different transmit diversity approaches in at least two adjacent time slots.

Information is typically transmitted from one location to another using only a single antenna in older wireless communications systems. For instance, in conventional cellular telephone systems, information from a base station to a given mobile terminal would be transmitted using a single antenna at the base station. While such single antenna approaches have been generally successful, it has be suggested that better performance may be achieved through the use of transmit diversity. Transmit diversity involves the transmission of information using more than one antenna. One reason for using transmit diversity is that the signal received at the mobile terminal from the second antenna may, in some circumstances, be stronger than that received from the first antenna due to path differences between the signals from the two antennas, even if the same overall transmit power is used. Several forms of transmit diversity have been proposed, with varying degrees of robustness and suitability for particular situations. While transmit diversity may have some theoretical advantages, transmit diversity has proven somewhat difficult to implement in practice, particularly in ways that allow so-called legacy mobile terminals (e.g., older mobile phones) to remain operational.

BRIEF SUMMARY OF THE INVENTION

An approach to hybrid transmit diversity which involves the transmission of information using different forms of transmit diversity for at least two adjacent time slots is disclosed. In one aspect of the present invention, particularly suited to communications from a base station to mobile terminals, information is transmitted using a first transmit diversity technique during a first time slot and then information is transmitted using a second transmit diversity technique in the next subsequent time slot. For example, a base station may transmit information to mobile terminal X using delay diversity during time slot $ts_1$ and then transmit information to mobile terminal Y using X space-time diversity during the next time slot, $ts_2$.

In another aspect of the present invention, particularly suited to communications according to the standard known as Global System for Mobile Communication, most transmissions are made with delay diversity, but the logical channel known as the Frequency Correction Channel is transmitted with combined delay diversity and antenna hopping diversity. In some optional aspects, the antenna hopping diversity is accomplished using virtual antenna hopping (described below).

In yet another aspect of the present invention, particularly suited to communications according to the standard known as TIA/EIA-136, transmissions are made with delay diversity in a first time slot of a frame and with space-time diversity in a second time slot of the frame. Methods are disclosed below for accommodating the change in diversity techniques between the time slots that involve either transmitting dummy symbol(s) as part of the data field or stealing symbol(s) from the sync field to use in the data field.

DETAILED DESCRIPTION OF THE INVENTION

Figure 1:
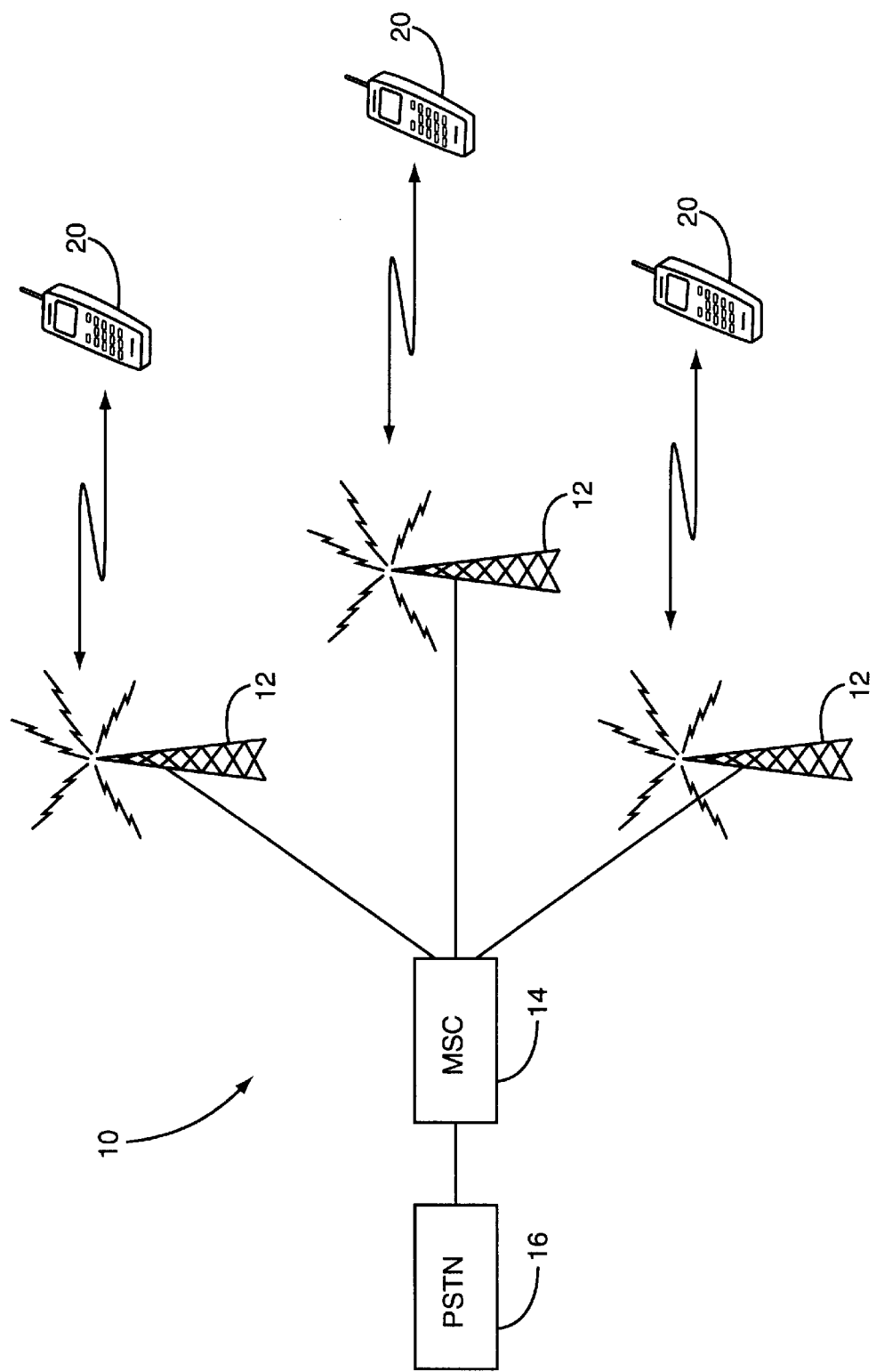
FIG. 1 shows a wireless communications system.

Referring now to FIG. 1, the present invention will be discussed in the context of a wireless communications system 10 that includes one or more mobile terminals 20. The wireless communications system 10 includes a plurality of base stations 12 which are connected via a mobile services switching center (MSC) 14 to a terrestrial communications network such as the Public Switched Telephone Network (PSTN) 16. Each base station 12 is located in and provides service to a geographic region referred to as a cell. In general, there is one base station 12 for each cell within a given system. Within each cell, there may be a plurality of mobile terminals 20 that communicate via a radio link with the base station 12. The base station 12 allows the user of the mobile terminals 20 to communicate with other mobile terminals 20, or with users connected to the PSTN 16. The MSC 14 routes calls to and from the mobile terminal 20 through the appropriate base station 12. The general overall operation of the wireless communications system 10 may be according to any one of a wide variety of operating standards, such as TIA/EIA-136, Global System for Mobile Communication (GSM), Pacific Digital Cellular (PDC), and the like. Other than the transmit diversity approach(s) outlined below, the operation of the wireless communications system 10 is well known in the art and will not be discussed further herein.

The present invention involves the use of transmit diversity for communications from the base station 12 to the mobile terminal 20; these communications are sometimes referred to as downlink communications. As mentioned above, transmit diversity involves the use of two or more antennas to transmit information. For clarity, the following description will be in the context of transmit diversity with only two antennas (labeled A and B for simplicity), but the present invention is not so limited and additional transmit antennas may also be involved without departing from the scope of the present invention.

One form of transmit diversity is delay diversity where the information transmitted from antenna B is identical to, but delayed with respect to, the information transmitted from antenna A. Typically, the delay is some integer multiple of a symbol, such as one symbol, two symbols, etc., but this is not required. Another form of transmit diversity is known as space-time diversity. With space-time diversity, the two signals from the two antennas are different, but interrelated. For instance, an approach suggested by Alamouti uses two symbol codes where antenna A transmits the symbol pair $s_1$ and $s_2$ while antenna B transmits the symbol pair $-s^*_2$ and $s^*_1$ for the same time instant, where $s^*$ is a complex conjugate function of s. More information regarding the Alamouti space-time diversity approach may be found in an article entitled "A Simple Transmit Diversity Technique For Wireless Communications" by S. M. Alamouti in IEEE Journal of Selected Areas in Communications, October 1998, pp. 1451–1458, which is incorporated herein by reference. As can be seen, the two signals are related, but not identical for space-time diversity. Yet another form of transmit diversity is antenna hopping. In antenna hopping, consecutive information segments are transmitted by different antennas. For example, a first portion of a message is transmitted by antenna A while a second portion of the message is transmitted by antenna B, with the next by antenna A, and so forth. Thus, the transmission "hops" back and forth between the antennas. Another example of antenna hopping diversity is referred to herein as "virtual antenna hopping" and is explained further below.

Figure 2:
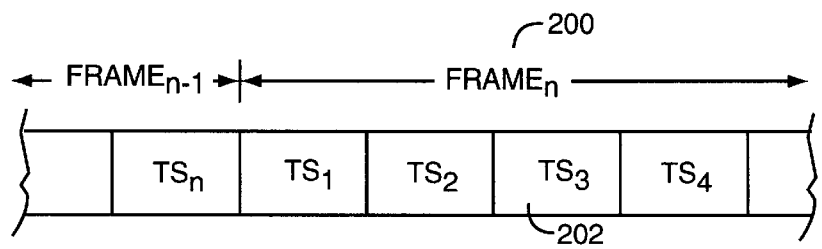
FIG. 2 shows a portion of a transmit signal stream including a frame boundary and a plurality of time slots.

A simple example of the present invention may be shown with reference to FIG. 2. It is assumed that the wireless communications system 10 utilizes time division multiplexing such that transmission time is divided into a plurality of transmit time periods, typically referred to as frames 200, with each frame further divided into a plurality of time slots 202. A basic form of the present invention may be illustrated by having antennas A and B transmit with a delay transmit diversity technique in time slot $ts_1$ 202 and thereafter transmit with a space-time diversity in time slot $ts_2$ 202. For time slot $ts_3$ 202, the space-time transmit diversity scheme used in $ts_2$ may be continued, or the delay diversity scheme of $ts_1$ may be used, or a third type of transmit diversity may be used, or no transmit diversity may be used. Because different types of transmit diversity are being used in at least two adjacent time slots 202 (e.g., $ts_1$ and $ts_2$), this overall approach may be called hybrid transmit diversity.

One potential benefit of hybrid transmit diversity may be illustrated by assuming that older model mobile terminals 20 (sometimes referred to as "legacy" mobile terminals) can tolerate antenna hopping diversity and/or delay diversity of one symbol, but not space-time diversity. Further assume both that newer mobile terminals 20 are designed to handle antenna hopping diversity, delay diversity, and space-time diversity, and that it is desired to take advantage of the robustness of space-time diversity whenever possible. In such a situation, a base station 12 may tailor its transmissions to the particular capabilities of the targeted mobile terminal 20. To do so, it may be desirable for the base station 12 to know the capabilities of each of the mobile terminals 20 that it is responsible for. This may be achieved in any convenient manner, such as by the base station 12 having access to an appropriate database of capabilities keyed to the identity of mobile terminals 20 (serial number, or model number, or manufacture date, etc.), or by the mobile terminal sending such information to the base station 12 (or MSC 14) upon registration, or the like. Thus, a base station 12 may know that the mobile terminals 20 assigned to time slots $ts_1$ and $ts_3$ are legacy mobile terminals, while the mobile terminal 20 assigned to time slot $ts_2$ is a newer model. Based on this information, the base station 12 may transmit with delay diversity in $ts_1$ and $ts_3$, but with space-time diversity in $ts_2$. Thus, the use of hybrid transmit diversity allows the transmissions from the base station 12 to be tailored to the capabilities of the respective mobile terminals 20, if so desired.

It should be noted that the mobile-terminal specific tailoring discussed above is not required and the present invention may be practiced without taking advantage of this potential benefit. Indeed, there are other reasons for changing transmit diversity techniques in two or more adjacent time slots 202. For example, the technique above may be used in a GSM system to improve detection of the Frequency Correction Channel (FCCH). The FCCH is a logical channel that is periodically transmitted by base stations in a GSM system and used as an aid in timing synchronization. The FCCH typically occupies its own time slot 202. The present invention may be practiced by having information for all logical channels other than the FCCH transmitted via antennas A and B using a delay transmit diversity technique, but the FCCH transmitted with both a combined delay diversity and antenna hopping transmit diversity technique. Thus, the transmit signal streams of the two antennas may be as shown below (with each letter filling a time slot):

| Antenna | Signal Stream Transmitted |
|---------|---------------------------|
| A | FOOOO . . . NOOOO . . . FOOOO . . . NOOOO . . . |
| B | NOOOO . . . FOOOO . . . NOOOO . . . FOOOO . . . | with F representing the transmission of the FCCH, N representing that nothing is transmitted, and O representing where other channels are transmitted. All of the channels are transmitted with delay diversity of one symbol (B delayed one symbol with respect to A). Of course, the "O" slots may instead be transmitted with some other transmit diversity technique, such as space-time diversity; however, due to the particular characteristics of the FCCH, it is believed that antenna hopping diversity (and/or combined delay and antenna hopping diversity) is the best approach for the FCCH. For this example, the hybrid transmit diversity scheme outlined above may be used in a GSM system 10 with modifications only to the base station 12, thereby allowing both legacy and "new" mobile terminals 20 to use the same FCCH without "knowledge" of the individual mobile terminal capabilities.

Figure 3:
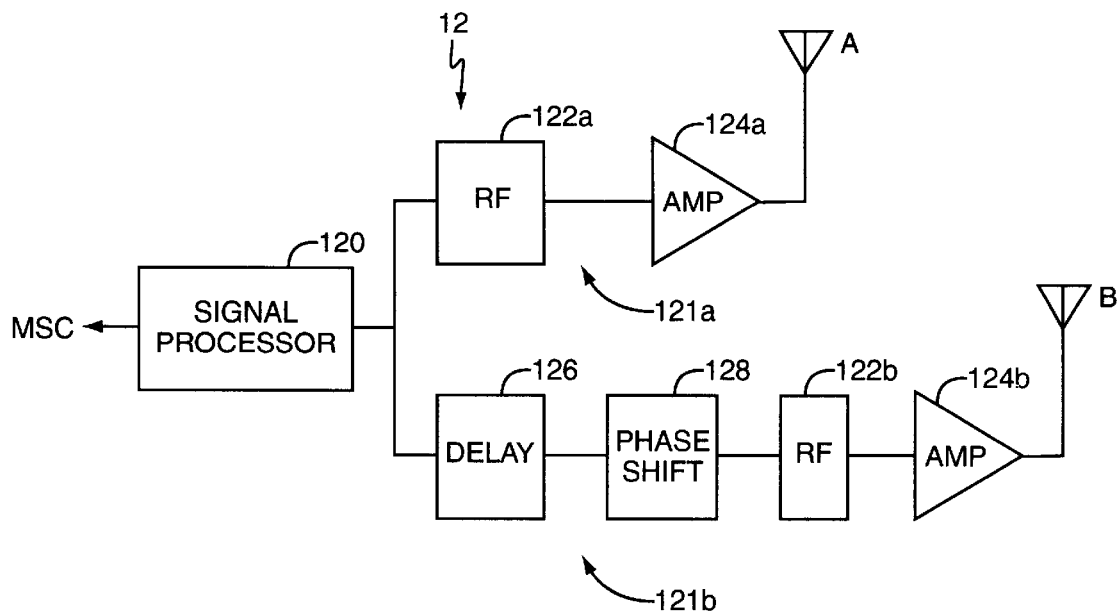
FIG. 3 shows one embodiment of a base station adapted to practice the present invention.

The antenna hopping diversity for FCCH may be achieved by a base station 12 that supplies full transmit power to each antenna. However, an alternative arrangement employs a virtual antenna hopping technique that may be explained with reference to FIG. 3. In FIG. 3, the signal processor 120 of the base station 12 is connected to two transmit paths 121a,121a. The transmit paths 121a,121a include respective RF modulators 122a,122b disposed between the signal processor 120 on one side and a power amplifier 124a,124b on the other, with the respective antenna (A,B) downstream from the power amplifier 124a, 124b. The second transmit path 121b differs from the first transmit path 121a in that it includes an optional delay block 126 and a phase shifter 128 disposed between the signal processor 120 and the RF modulator 124b. The signal processor 120 generates the underlying information to be transmitted. This information is passed to both the first transmit path 121a and the second transmit path 121b. The supply of the information to the transmit paths 121a,121b may be done by splitting the output signal of the signal processor 120 as shown in FIG. 3 or by supplying separate outputs for each transmit path 121a,121b; the later approach may be more appropriate if space-time diversity is to be used. The first transmit path 121a processes the information in the usual fashion, with the RF modulator 122a converting the signal to the appropriate channel frequency, the amplifier 124a boosting the signal strength, and antenna A transmitting the signal. The second transmit path 121b operates similarly, but the information is optionally delayed one symbol by delay block 126 prior to being passed on. In addition, when FCCH information is being processed, the phase shifter 128 applies a time-varying phase shift to the information before passing the same to the RF modulator 122b. Thus, a time-varying phase shift (or complex gain) is added to the signal transmitted from antenna B. One approach to applying a time-varying phase shift is to apply a simple gain toggle of +1 and −1 to the FCCH information. For instance, assuming each frame includes an FCCH in time slot $ts_1$, a gain of +1 would be applied to $ts_1$ of frame one; a gain of −1 would be applied in $ts_1$ n of the next frame; a +1 gain in $ts_1$ of the next frame, and so forth. Even if the fading of the FCCH channel were severe with the gain of +1 (frame one, frame three, . . . ) due to the destructive addition of the faded signals transmitted from the two antennas, it is unlikely that the fading will be severe with the gain set to −1 (frame two, . . . ) because the faded signals would tend to add constructively. Thus, it is likely that the FCCH detection by mobile terminals 20 will be improved. In addition, one particular advantage of this virtual antenna hopping diversity technique, which for purpose herein is considered one antenna hopping transmit diversity technique, is that the power amplifiers 124a,124b do not need to be full power, but may instead be half power. Thus, for a total transmit power of P, each transmit path 121a,121b may supply ½ P.

In one exemplary aspect of the present invention, GSM transmissions from the base stations may be controlled as follows: FCCH information may be transmitted with antenna hopping transmit diversity (actual or virtual, with or without delay), other broadcast control channel information (other than FCCH) may be transmitted with delay transmit diversity, and traffic channel information may be transmitted with space-time transmit diversity. It should be noted that "broadcast control channel information" means control channel information transmitted to a plurality of users in a broadcast fashion. Some examples of broadcast control channel information, known to those in the art, include FCCH, Synchronization channel (SCH), Broadcast Control Channel (BCCH), the Common Control Channel (CCCH), and the sub-parts thereof including, for example, the Paging Channel (PCH) and the Access Control Channel (AGCH).

Figure 4:
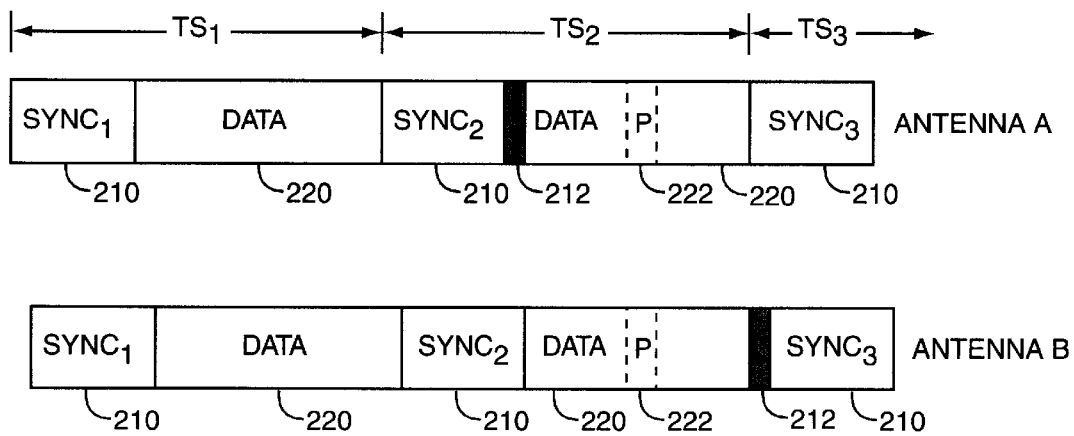
FIG. 4 shows a portion of an TIA/EIA-136 transmit signal stream from two antennas using one approach to the hybrid transmit diversity of the present invention.
Figure 5:
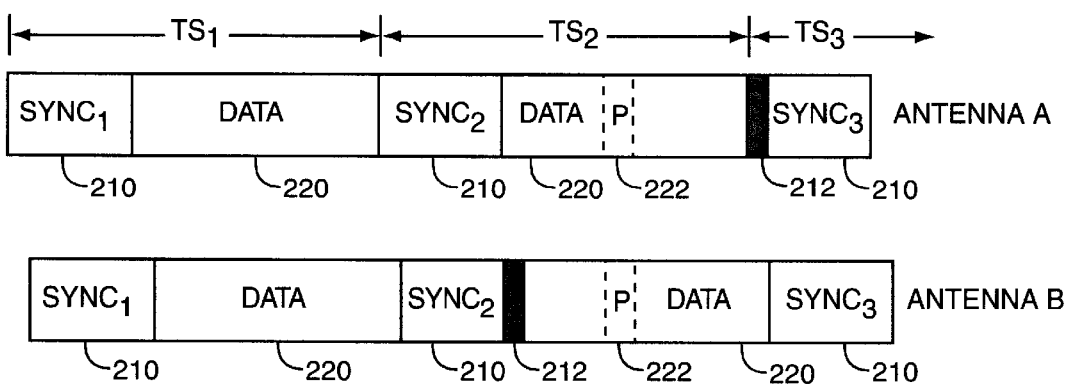
FIG. 5 shows a portion of an TIA/EIA-136 transmit signal stream from two antennas using another approach to the hybrid transmit diversity of the present invention.

The discussion above has focused on GSM systems 10 for illustrative purposes. While current GSM systems 10 are tolerant of changes in transmit diversity from time slot 202 to time slot 202, the present invention is not limited to GSM applications. Indeed, the present invention may be used in wireless communications systems 10 operating according to a wide variety of standards. An example in the context of an TIA/EIA-136 system 10 and FIGS. 4–5 may help illustrate this point. FIG. 4 shows Hi one approach of using hybrid transmit diversity with the output of antenna A shown above the output of antenna B. The time slot 202 $ts_1$, $ts_2$, $ts_3$, . . . typically include sync fields 210 and data fields 220. For purposes of this discussion, each field 210, 220 may be thought of as containing a plurality of symbols. As shown in FIG. 4, the output of antenna B is delayed one symbol with respect to the output of antenna A during time slot $ts_1$. Thus, $ts_1$ uses delay transmit diversity. When time slot $ts_2$ is encountered, sync field 210 $sync_2$ is transmitted as normal by antenna A, but a dummy symbol 212 is inserted between $sync_2$ and the data field 220 of $ts_2$ from antenna A. This dummy symbol 212 has the effect of time aligning the data fields 220 of the two antennas. The data fields 220 may then be transmitted with space-time diversity, such as with Alamouti coding. If necessary, so-called pilot symbols 222 may be transmitted during the data field 220 of time slot $ts_2$ to aid in obtaining intermediate channel estimates. When the end of the data field 220 is reached by antenna A, sync field 210 $sync_3$ is transmitted. However, the controller for antenna B inserts a dummy symbol 212 between the data field 220 of $ts_2$ and $sync_3$. Thus, for $ts_3$, the diversity technique is changed from space-time back to delay diversity. Of course, if $ts_3$ is instead also to be subject to space-time diversity, the insertion of the dummy symbol 212 in the antenna B transmit stream may be put off until a time slot 202 requiring the delay diversity of $ts_1$ is encountered, such as at the beginning of $ts_1$ of the next frame 200. It should be noted that the dummy symbol 212 may either be included or excluded from the coding algorithm used in the space-time diversity for $ts_2$. Also, instead of transmitting a dummy symbol 212, a similar approach may be used that "steals" one or more symbols 212 from the relevant sync field(s) 210 and uses the stolen symbol(s) 212 for the data field 220 as shown in FIG. 5.

One advantage of the approaches outlined immediately above is that legacy TIA/EIA-136mobile terminals 20, such as those designed according to TIA/EIA-136A (not space-time diversity compatible) will continue to work with base stations 12 that are also designed to work with later mobile terminals 20, such as such as those designed according to TIA/EIA-136C (space-time diversity compatible). It should be noted that it is believed that TIA/EIA-136A mobile terminals 20 can both tolerate one symbol delay transmit diversity and a loss of one sync symbol, particularly farthest from the relevant data field 220, without undue degradation in performance.

It should be noted that the term "mobile terminal" 20 as used herein may include a cellular radiotelephone with or without a multi-line display; a Personal Communications System (PCS) terminal that may combine a cellular radio-telephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radio-telephone transceiver. Mobile terminals 20 may also be referred to as "pervasive computing" devices.

The present invention may, of course, be carried out in other specific ways than those herein set forth without departing from the scope of the invention. The present embodiments are, therefore, to be considered in all respects as illustrative and not restrictive, and all changes coming within the meaning and equivalency range of the appended claims are intended to be embraced therein.

What is claimed is:

1. A method of time division multiplexing in a wireless communications system having transmit time periods divided into a plurality of time slots, comprising:

transmitting information using a first transmit diversity technique during a first time slot; and transmitting information using a second transmit diversity technique during an adjacent time slot.

2. The method of claim 1 further including operating said wireless communications system according to a GSM standard during said first time slot and said second time slot.

3. The method of claim 1 wherein transmitting information using said first transmit diversity technique during said first time slot comprises transmitting information using an antenna hopping transmit diversity technique during said first time slot.

4. The method of claim 1 wherein transmitting information using said second transmit diversity technique during said second time slot comprises transmitting information using an antenna hopping transmit diversity technique during said second time slot.

5. The method of claim 1 wherein said first and second transmit diversity techniques are selected from the group consisting of delay transmit diversity, space-time transmit diversity, and antenna hopping transmit diversity.

6. The method of claim 2 wherein transmitting information using said first transmit diversity technique during said first time slot comprises transmitting FCCH information using an antenna hopping transmit diversity technique during said first time slot.

7. The method of claim 6 wherein transmitting FCCH information using said antenna hopping transmit diversity technique during said first time slot comprises transmitting FCCH information using a virtual antenna hopping transmit diversity technique during said first time slot.

8. The method of claim 7 wherein transmitting FCCH information using a virtual antenna hopping transmit diversity technique during said first time slot comprises:
  transmitting FCCH information in a first time period via a first antenna and via a second antenna; and
  thereafter, transmitting FCCH information in a second time period via said first antenna and transmitting a phase-shifted version of the same FCCH information in said second time period via said second antenna.

9. The method of claim 8 wherein transmitting FCCH information in said second time period via said first antenna and transmitting said phase-shifted version of the same FCCH information in said second time period via said second antenna comprises transmitting FCCH information in said second time period via said first antenna and transmitting an inverted version of the same FCCH information in said second time period via said second antenna.

10. The method of claim 8 further comprising thereafter transmitting FCCH information in a third time period via said first antenna and via said second antenna.

11. The method of claim 8 wherein:
  transmitting FCCH information in said first time period via said first antenna and via said second antenna comprises transmitting FCCH information via said first antenna with a first time alignment and via said second antenna with a second time alignment, said second time alignment delayed with respect to said first time alignment; and
  transmitting FCCH information in said second time period via said first antenna and transmitting a phase shifted version of the same FCCH information in said second time period via said second antenna comprises transmitting FCCH information via said first antenna with said first time alignment and transmitting a phase shifter version of the same FCCH information via said second antenna with said second time alignment.

12. The method of claim 6 further comprising:
  transmitting broadcast control channel information other than said FCCH information via said first and second antennas using a delay diversity technique; and
  transmitting information on traffic channels via said first and second antennas using a transmit diversity technique.

13. The method of claim 12 wherein transmitting information on traffic channels via said first and second antennas using a transmit diversity technique comprises transmitting information on traffic channels via said first and second antennas using a transmit diversity technique different than the transmit diversity techniques used for said FCCH and said broadcast control channel information other than said FCCH information.

14. A method of time division multiplexing in a wireless communications system having transmit time periods divided into a plurality of time slots, comprising:

determining which diversity transmit techniques a first mobile terminal is compatible with, and based thereon transmitting information to said first mobile terminal using a first transmit diversity technique during a first time slot; and
  determining which diversity transmit techniques a second mobile terminal is compatible with, and based thereon transmitting information to said second mobile terminal using a second transmit diversity technique during a second time slot, said second time slot adjacent to said first time slot.

15. The method of claim 14 wherein determining which diversity transmit techniques said first mobile terminal is compatible with comprises receiving a transmission from said first mobile terminal indicating compatibility of said first mobile terminal with at least one diversity transmit technique.

16. The method of claim 14 wherein determining which diversity transmit techniques said first mobile terminal is compatible with comprises receiving an identification from said first mobile terminal and referencing a database based on said identification, said database containing diversity transmit compatibility information.

17. The method of claim 14 further comprising transmitting information to both said first mobile terminal and said second mobile terminal during a third time slot using a transmit diversity technique.

18. The method of claim 17 wherein transmitting information to both said first mobile terminal and said second mobile terminal during a third time slot using a transmit diversity technique comprises transmitting information to both said first mobile terminal and said second mobile terminal during a third time slot using a transmit diversity technique different from said first transmit diversity technique.

19. The method of claim 17 wherein transmitting information to both said first mobile terminal and said second mobile terminal during a third time slot using a transmit diversity technique comprises transmitting information to both said first mobile terminal and said second mobile terminal during a third time slot using a transmit diversity technique different from said second transmit diversity technique.

20. The method of claim 17 wherein transmitting information to both said first mobile terminal and said second mobile terminal during a third time slot using a transmit diversity technique comprises transmitting information to both said first mobile terminal and said second mobile terminal during a third time slot using a transmit diversity technique different from both said first transmit diversity technique and said second transmit diversity technique.

21. The method of claim 20 wherein said third transmit diversity technique used during said third time slot is an antenna hopping transmit diversity technique.

22. The method of claim 21 wherein transmitting information to both said first mobile terminal and said second mobile terminal during a third time slot using a transmit diversity technique comprises transmitting FCCH information to both said first mobile terminal and said second mobile terminal during a third time slot using an antenna hopping transmit diversity technique.

23. A method of transmitting information using transmit diversity on a first antenna and a second antenna in a wireless communications system having transmit time periods divided into a plurality of time slots, comprising:
  during a first time slot, transmitting a first information portion using a delay transmit diversity technique via said first antenna and said second antenna wherein the transmissions from said second antenna are phase-shifted with respect to transmissions from said first antenna during said first time slot;

during a second time slot immediately subsequent to said first time slot, transmitting a second information portion using a transmit diversity technique different than during said first time slot via said first antenna and said second antenna, said second information portion comprising a sync field and a data field; and causing said data fields of said first and second antennas to be time aligned in said second time slot.

24. The method of claim 23 wherein the transmissions from said second antenna are delayed with respect to transmissions from said first antenna during said first time slot.

25. The method of claim 23 wherein causing said data fields of said first and second antennas to be time aligned in said second time slot comprises said first antenna transmitting at least one dummy symbol between said sync field and said data field and said second antenna transmitting a corresponding number of dummy symbols after said data field.

26. The method of claim 25 wherein transmitting said second information portion during said second time slot using a transmit diversity technique different than during said first time slot comprises transmitting said data field of said second information portion using a multi-symbol coding scheme during said second time slot.

27. The method of claim 26 wherein transmitting said data field of said second information portion using a multi-symbol coding scheme comprises transmitting the combination of said dummy symbols and said data field of said second information portion using a multi-symbol coding scheme.

28. The method of claim 23 wherein causing said data fields of said first and second antennas to be time aligned in said second time slot comprises stealing the last symbol of said sync field transmitted by said second antenna for use as a symbol in said data field of said second time slot by said second antenna.

29. The method of claim 28 further comprising said first antenna transmitting a subsequent sync field during a third time slot immediately subsequent to said second time slot and wherein causing said data fields of said first and second antennas to be time aligned in said second time slot further comprises stealing the first symbol of said subsequent sync field transmitted by said first antenna for use as a symbol in said data field of said second time slot by said first antenna.

30. A method of transmit diversity, comprising in a first time interval, transmitting a first information portion via a first antenna and a second antenna; and in a second time interval subsequent to said first time interval, transmitting a second information portion via said first antenna and transmitting a phase-shifted version of said second information portion via said second antenna.

31. The method of claim 30 wherein transmitting a phase-shifted version of said second information portion via said second antenna comprises transmitting a delayed version of said second information portion via said second antenna.

32. The method of claim 30 further comprising transmitting, in a third time interval subsequent to said second time interval, a third information portion via said first and second antennas; and transmitting, in a fourth time interval subsequent to said third time interval, a fourth information portion via said first antenna and transmitting a phase-shifted version of said fourth information portion via said second antenna.

33. The method of claim 30 wherein:

transmitting said first information portion via said first antenna and said second antenna comprises transmitting FCCH information via said first antenna and said second antenna;

transmitting said second information portion via said first antenna comprises transmitting FCCH information via said first antenna;

transmitting said phase-shifted version of said second information portion via said second antenna comprises transmitting FCCH information via said second antenna.

34. The method of claim 32 wherein said first, second, third, and fourth information portions comprise FCCH information.

35. A transmit circuit for a wireless communications base station, comprising:

a signal processor connected to a first antenna via a first transmit path and to a second antenna via a second transmit path;

said second transmit path including a phase shifter disposed between said signal processor and said second antenna, said phase shifter applying a time-varying phase shift to inputs received from said signal processor, thereby selectively altering the transmissions from said second antenna; and said transmit circuit adapted to transmit at least some information via said first and second antennas using an antenna hopping transmit diversity technique.

36. The transmit circuit of claim 35 wherein said at least some information transmitted using said antenna hopping technique is FCCH information.

37. The transmit circuit of claim 35 wherein said antenna hopping transmit diversity technique is a virtual antenna hopping technique.

* * * * *